United States Patent [19]
Citta et al.

[11] Patent Number: 5,161,015
[45] Date of Patent: Nov. 3, 1992

[54] SYSTEM FOR PEAKING A VIDEO SIGNAL WITH A CONTROL SIGNAL REPRESENTATIVE OF THE PERCEPTUAL NATURE OF BLOCKS OF VIDEO PIXELS

[75] Inventors: Richard W. Citta, Oak Park; Stephen M. Dicke, Wheeling, both of Ill.

[73] Assignee: Zenith Electronics Corporation, Glenview, Ill.

[21] Appl. No.: 678,778

[22] Filed: Apr. 1, 1991

Related U.S. Application Data

[63] Continuation-in-part of Ser. No. 636,307, Dec. 31, 1990, abandoned.

[51] Int. Cl.$^5$ .............................................. H04N 5/208
[52] U.S. Cl. ..................................... 358/162; 358/166
[58] Field of Search .................... 358/166, 167, 36, 37, 358/38, 133, 138, 158, 162

[56] References Cited

U.S. PATENT DOCUMENTS

| | | | |
|---|---|---|---|
| 4,179,709 | 12/1989 | Workman | 358/133 |
| 4,263,616 | 4/1981 | Lee | 358/166 |
| 4,603,353 | 7/1986 | Henson | 358/38 |
| 4,734,767 | 3/1988 | Kaneko et al. | 358/133 |
| 4,780,761 | 10/1988 | Daley et al. | 358/133 |
| 4,931,869 | 6/1990 | Amor et al. | 358/135 |
| 5,014,119 | 5/1991 | Faroudja | 358/166 |

*Primary Examiner*—James J. Groody
*Assistant Examiner*—M. Powell

[57] ABSTRACT

A peaking system for a compressed digital video signal includes a transform coder for converting 8×8 blocks of video pixels into corresponding groups of transform coefficients and supplying the coefficients to an image classifier where the coefficients are classified according to their perceptual nature or image types, e.g. edge, flat area, texture, etc. of the video represented thereby. Control signals for horizontal and vertical perceptual classifications are developed and applied to a peaking filter for selectively peaking the video signal in accordance with the horizontal and vertical control signals. A receiver operates to recover the selectively peaked compressed video signal. In another embodiment, the transmitter supplies the video signal with the developed control signals for use by a receiver in selectively peaking the recovered video signal in accordance with the control signals.

14 Claims, 4 Drawing Sheets

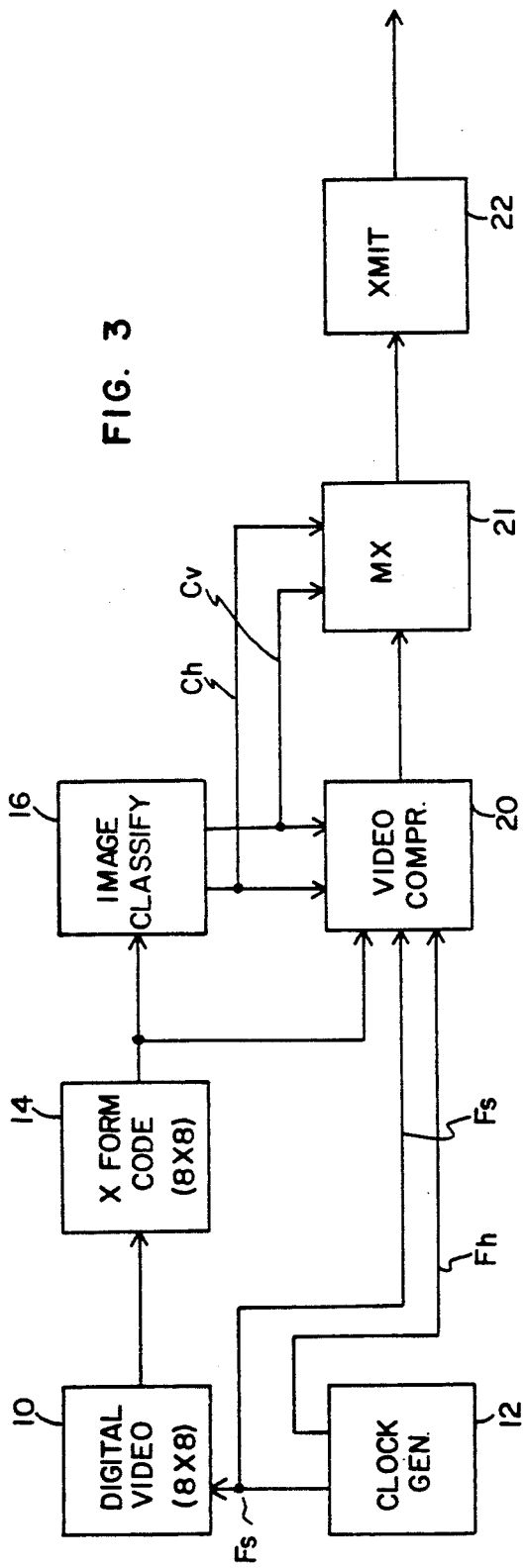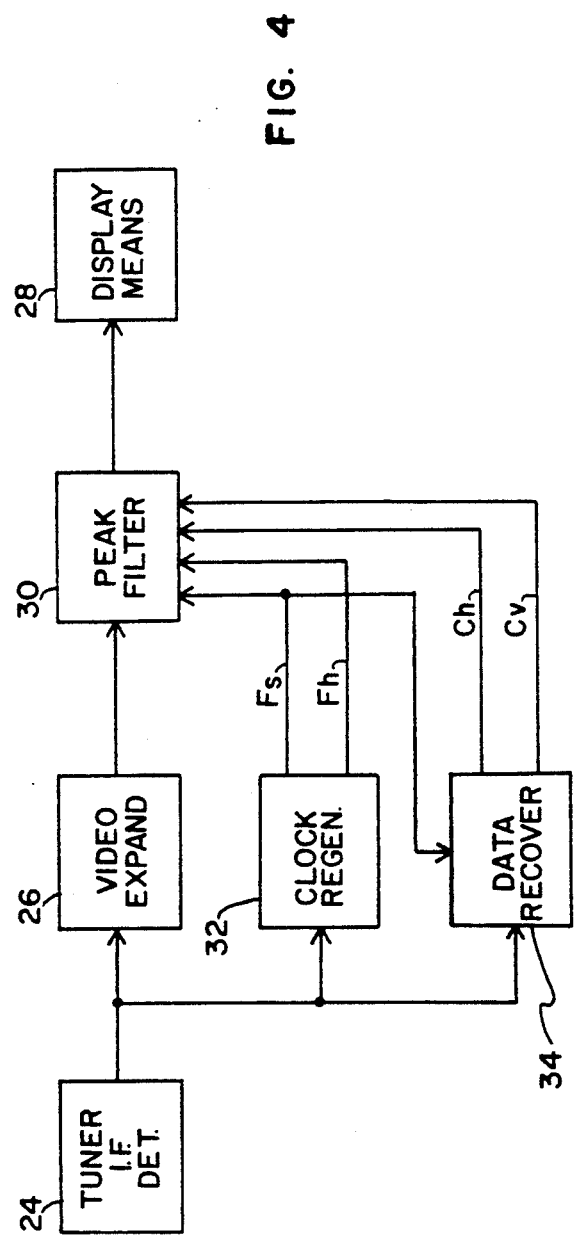

SYSTEM FOR PEAKING A VIDEO SIGNAL WITH A CONTROL SIGNAL REPRESENTATIVE OF THE PERCEPTUAL NATURE OF BLOCKS OF VIDEO PIXELS

CROSS REFERENCE TO RELATED PATENT APPLICATION

This application is a continuation-in-part of Ser. No. 636,307, filed Dec. 31, 1990, and now abandoned.

This invention utilizes apparatus disclosed in copending application Ser. No. 539,770, filed Jun. 18, 1990, now U.S. Pat. No. 5,128,757, entitled VIDEO TRANSMISSION SYSTEM USING ADAPTIVE SUBBAND CODING, and application Ser. No. 653,560, filed Feb. 8, 1991, now U.S. Pat. No. 5,113,256, entitled PERCEPTUAL MODEL FOR A VIDEO SIGNAL, both in the names of Richard M. Citta and Stephen M. Dicke, and both assigned to Zenith Electronics Corporation, which applications are hereby incorporated by reference.

BACKGROUND OF THE INVENTION AND PRIOR ART

This invention relates generally to video peaking systems and particularly to video peaking systems for use in wide band high definition television systems. Peaking systems for television video signals are notoriously old in the art. Commonly, peaking of a video signal involves enhancing the horizontal and/or vertical transitions or edges of the video image to provide a sharper display. To avoid the peaking of noise and noise components, the video signal may be applied to a so-called "coring" circuit, which removes the noise prior to peaking of the video signal. While noise coring circuits do provide enhanced peaking performance, coring is a relatively coarse technique and is somewhat deficient in results produced.

In the HDTV video system described in the above-mentioned copending application Ser. No. 539,770, a 36 MHz wide band video signal is compressed for transmission in a standard 6 MHz television band. This is generally accomplished by transform coding successive blocks of the image signal, processing the transform coefficients generated for each block and applying them to an image classifier, where the coefficients are grouped or classified according to their perceptual nature or image type. The image classifications may generally include a boundary, edge, texture, flat video and low AC or a combination thereof. The derived classification is then used to control the level of compression effected for each respective block. The foregoing technique is clearly set forth in the above-mentioned copending application Ser. No. 539,770 and will not be further elaborated upon here.

Copending application Ser. No. 653,560 is directed to a video compression scheme that improves quantization efficiency by controlling coefficient resolution as a function of the perceptual characteristic of the video image. A system for perceptually modelling a video image signal to enhance its compressibility is shown.

The present invention goes beyond that of copending application Ser. No. 539,770 by developing a control signal (in the preferred embodiment, two control signals are developed) which reflects the perceptual nature of the video image and using the control signal to control peaking of the video signal. The invention may advantageously employ the perceptual modelling system of Ser. No. 653,560. The control signal may be used in the transmitter to control the level of the peaking component applied to the transmitted video signal or may be transmitted, along with the unpeaked video signal, to a receiver where the control signal is recovered and used to control peaking of the video signal in the receiver.

OBJECTS OF THE INVENTION

A principal object of the invention is to provide an improved video peaking system.

Another object of the invention is to provide a peaking system in which a peaking control signal is developed as a function of the perceptual nature of the video image being peaked.

A further object of the invention is to provide a novel video peaking system.

BRIEF DESCRIPTION OF THE DRAWINGS

These and other objects and advantages of the invention will become apparent upon reading the following description in conjunction with the drawings, in which:

FIG. 3 is a simplified block diagram of a system for generating peaking control signals in the transmitter;

FIG. 4 is a receiver operable with the transmitter of FIG. 3;

DESCRIPTION OF THE PREFERRED EMBODIMENTS

Figure 1:
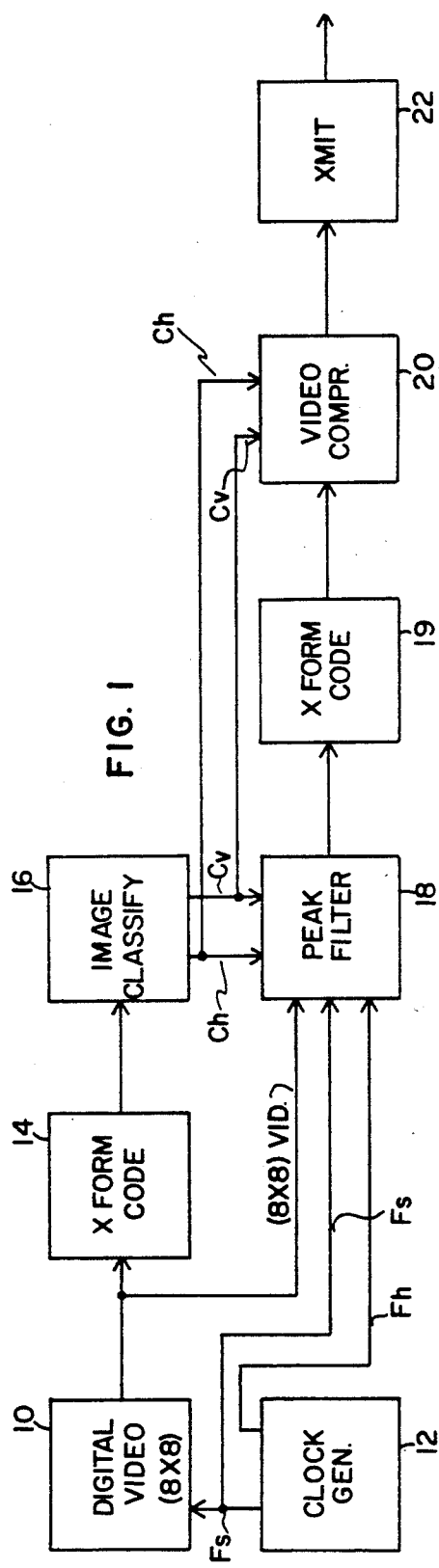
FIG. 1 is a simplified block diagram of a video peaking system constructed in accordance with the invention.

Referring to FIG. 1, a source 10 of digital video signal supplies successive formatted 8×8 blocks of video pixels. Each block of video pixels consists of eight horizontal pixels and eight vertical pixels and is applied to a transform coder 14 where a group of 64 corresponding transform coefficients is developed. Each group of coefficients is applied to an image classifier 16 where a pair of control signals Ch and Cv is developed that represents the horizontal and vertical nature of the image types or classifications of the corresponding pixel block. The transform coder 14 and image classifier 16 may operate in accordance with the above-mentioned copending application Ser. No. 539,770 to develop control signals that identify the perceptual characteristics or nature of the video image. For example, image classifier 16 may determine that a particular block of video pixels defines an edge and whether that edge is horizontal or vertical. Generally speaking, a control signal Ch is produced for controlling normal horizontal peaking. If vertical peaking is desired, a control signal Cv may also be produced. It will be understood by those skilled in the art that pixel delay circuits are involved to enable the video, which is normally in serial form to be formatted into blocks of 8×8 pixels as indicated.

A clock generator 12 supplies a clock signal Fs to digital video source 10 and to a peaking filter 18. Peaking filter 18 is also supplied with the output of digital video source 10, with a clock signal Fh from clock generator 12 and with the control signal, or signals, from image classifier 16. As will be explained in further detail hereinafter, peaking filter 18 adds a peaking component to each 8×8 block of video pixels in accordance with the control signals developed for the respective block by image classifier 16. The output of peaking filter 18 is then coupled to another transform coder 19 which transform codes each successive block of peaked video pixels to generate a corresponding group of 64 coefficients. The output of transform coder 19 is applied to a video compressor 20 which is also coupled to receive the control signals Ch and Cv. Video compression may, for example, involve truncation of selected transform coefficients in accordance with the perceptual classification assigned to the respective coefficient groups by image classifier 16. Specifically, the very wide band (36 MHz) digital video signal from source 10 is compressed for transmission in a conventional 6 MHz wide television channel. These techniques are well known in the art and form no part of the present invention. The output of video compressor 20 is applied to a transmitter 22 for transmission to a suitable receiver.

Figure 2:
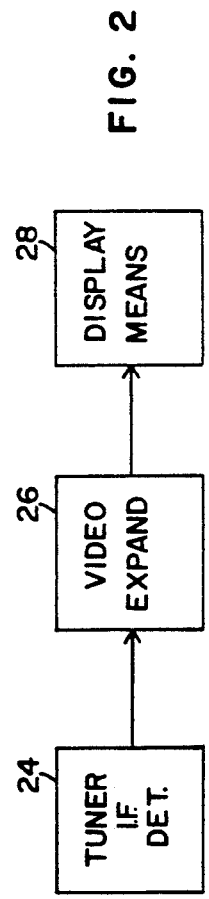
FIG. 2 is a simplified block diagram of a receiver operable with the transmitter of FIG. 1.

A suitable receiver is shown in FIG. 2 in very brief block form and includes a tuner, IF and detector 24 that receives and detects the compressed and peaked signal and applies it to a video expansion circuit 26 where operations complementary to that performed in transform coder 19 and video compressor 20 of FIG. 1 are accomplished. The output of the video expander circuit 26 is applied to a display means 28 which, as will be appreciated by those skilled in the art, includes apparatus for converting the 8×8 digital video blocks into a sequential video signal suitable for display on a display device such as a cathode ray tube. The signal displayed on the display means 28 will of course be peaked in accordance with the peaking that was provided in the transmitter of FIG. 1.

It should be apparent that peaking need not be performed in the transmitter, but that the peaking signals, or control signals if supplied with the transmitted signal, could be utilized by a suitably equipped receiver for peaking the signals in the receiver. That is the system which is disclosed in FIGS. 3 and 4. In FIG. 3, the source 10 of 8×8 blocks of digital video pixels is coupled to transform coder 14 whose output is applied to image classifier 16 as in FIG. 1 and also to video compressor 20. Clock generator 12 develops clock signals Fs and Fh which are applied to video compressor 20 which is controlled by the control signals Ch and Cv. No video peaking is performed in the transmitter, however. The output of video compressor 20 is coupled to a multiplex circuit 21 where the control signals Ch and Cv are incorporated by multiplexing them with the compressed transform coefficients. The combined output is applied to a transmitter 22 for transmission to a suitable receiver.

In FIG. 4, the receiver includes a tuner, IF and detector circuit 24 as in FIG. 2. The output of the detector is supplied to a video expander 26 which performs an inverse or complementary function to that of transform coder 14 and video compressor 20. The output of circuit 24 is also supplied to a clock regeneration circuit 32 and to a data recovery circuit 34. In the clock regeneration circuit, the clock signals Fs and Fh are recovered and are applied to a peaking filter 30 which is also supplied with the video pixel output of video expander circuit 26. The Fs signal is also coupled to data recovery circuit 34 which recovers the control signal Ch, and if used, the control signal Cv. The control signals are applied to peaking filter 30 to vary the effect of the peaking filter in accordance therewith to selectively peak each respective block of the expanded video signal (still in 8×8 block form). The output of peaking filter 30 is applied to display means 28 where, as described in connection with FIG. 2, the video signal is reconverted from its 8×8 block format to a serial format and is used to drive a suitable display device such as a CRT. Therefore, the peaking, which was determined in the transmitter, is applied in the receiver.

Figure 5:
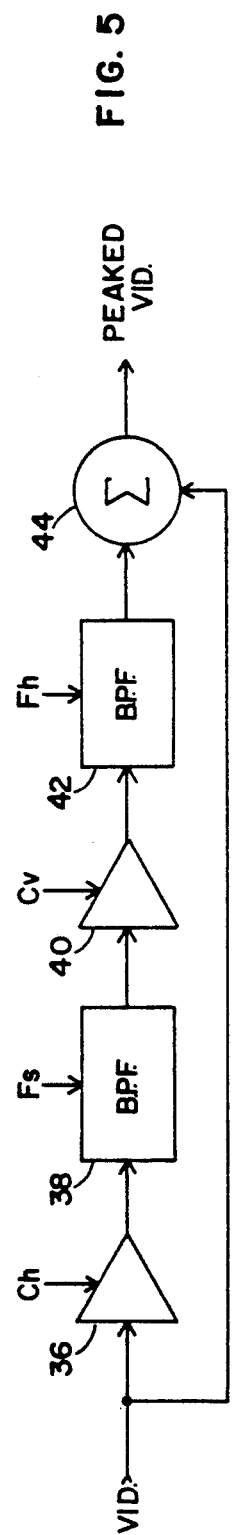
FIG. 5 illustrates a peaking filter that is operated in response to horizontal and vertical control signals in accordance with the invention.

In FIG. 5, a peaking filter is generally indicated in block form. The video input is applied to the input of an amplifier 36 that has its gain controlled by the control signal Ch. The output of amplifier 36 is supplied to a bandpass filter 38 which is under the control of the clock signal Fs. The output of the bandpass filter is applied to another amplifier 40 that is gain controlled by control signal Cv. Its output is coupled to a bandpass filter 42 that is under control of clock signal Fh. The final output of bandpass filter 42 is coupled to a summation circuit 44, along with the video signal input to provide a selectively peaked output video signal. In the circuit of FIG. 5, a horizontal peaking component is applied by virtue of amplifier 36 and bandpass filter 38 and vertical peaking component is applied by virtue of amplifier 40 and bandpass filter 42. Obviously if only horizontal peaking is desired, the control signal Cv can be disabled and no vertical peaking will occur.

Figure 6A:
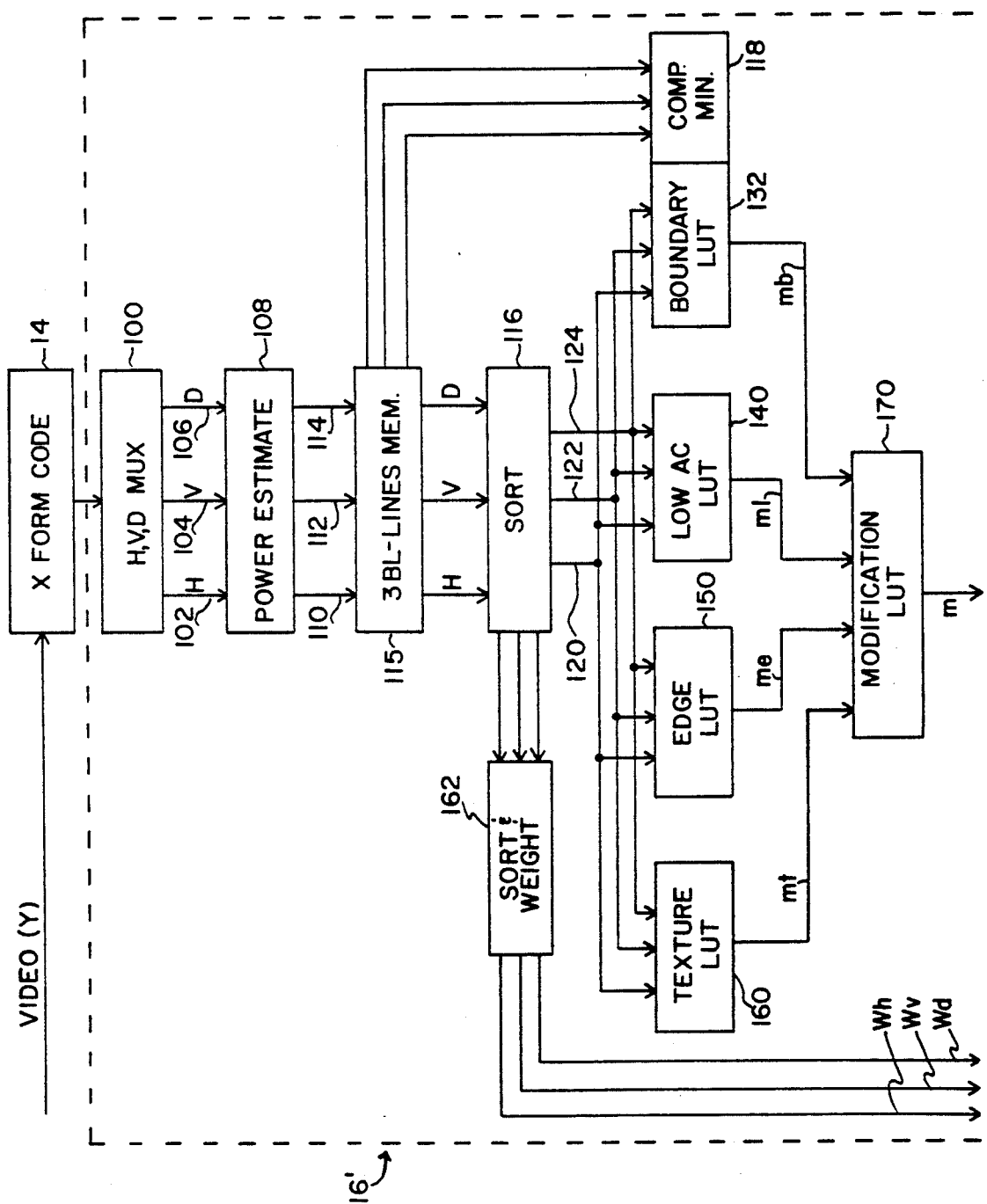
FIGS. 6A and 6B together illustrate an image classifier of the type disclosed in copending application Ser. No. 653,560 and a peaking circuit used therewith in this invention.
Figure 6B:
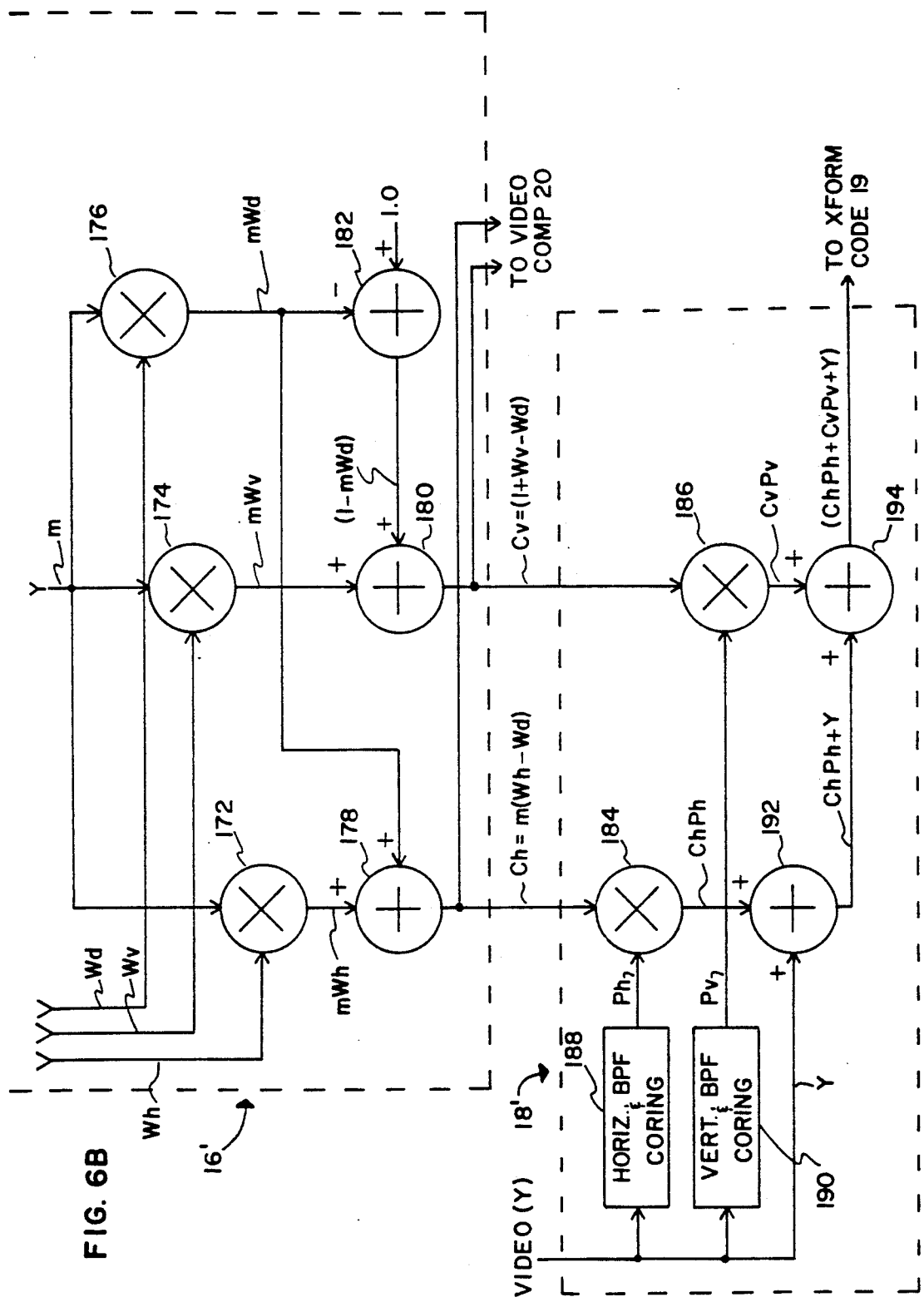

FIGS. 6A and 6B together form block diagrams of an image classifier 16' used to develop control signals Cv and Ch as based upon the disclosure of copending application Ser. No. 653,560 and a peaking circuit 18' that may be used therewith. These circuits may be used in place of corresponding image classifier and peaking circuits of FIGS. 1, 3 and 4. Image classifier 16' comprises an input multiplexer 100 for serially receiving the (8×8) coefficient blocks from transform coder 14 and separating the coefficients of each block into a plurality of spatially oriented subgroups. As fully described in the referent copending application, the subgroups represent regions H, V and D of the block of 64 coefficients. Multiplexer 100 provides a first output 102 comprising coefficients of region H which represent the horizontal frequencies of the corresponding portion of the video image, a second output 104 comprising the coefficients of region V which represent the vertical frequencies of the corresponding portion of the video image and a third output 106 comprising the coefficients of region D which represent the diagonal frequencies of the corresponding portion of the video image. The three outputs 102, 104 and 106 of multiplexer 100 are applied to a power estimation unit 108 which provides three outputs 110, 112 and 114 each comprising a signal representing the estimated energy in a respective one of the regions H, V and D. Output 110 thus comprises a signal representing the estimated energy of the coefficients in region H, output 112 a signal representing the estimated energy of the coefficients in region V, and output 114 a signal representing the estimated energy of the coefficients in region D.

The H, V and D regional energy estimations provided on outputs 110, 112 and 114, respectively, are coupled to a memory unit 115 where three block lines of information are stored. A sorting unit 116 and a computation unit 118 are supplied from memory 115. Sorting unit 116 sorts the three regional energy estimations according to magnitude, the largest or maximum being provided on an output 120, the second largest or mid value being provided on an output 122 and the smallest or minimum being provided on an output 124. Computation unit 118 (which is actually part of a boundary look-up table 132) provides three values representing the three smallest regional energy estimations of the regions H, V or D corresponding to the maximum energy estimations of the eight blocks immediately surrounding the currently processed block.

The maximum, mid value and minimum energy estimations are processed to determine the degree to which the coefficient block is characterized by the perceptual characteristics of boundary, low AC, edge and texture. The boundary characteristic is indicative of the extent to which the coefficient block represents a relatively distinct boundary between two separate portions of the video image. The low AC characteristic indicates the extent to which the coefficient block represents relatively low total energy, the edge characteristic indicates the extent to which the coefficient block represents video content in a single direction and the texture characteristic indicates the extent to which the coefficient block represents video content in two directions.

The extent or degree to which the coefficient block is characterized by the boundary characteristic is reflected in a boundary characteristic value mb derived at the output of boundary look-up table (LUT) 132 that is supplied with max, mid and min energy estimations from sort unit 116 and with the three smallest values among the eight surrounding blocks from computation unit 118.

The degree to which the coefficient block is characterized by the low AC, edge and texture characteristics is determined in a generally similar manner. More specifically, the max, mid and min values from sort unit 116 are each coupled to a low AC LUT 140 which provides a low AC characteristic value ml, an edge LUT 150 which provides an edge characteristic value me and a texture LUT 160 which provides a texture characteristic value mt.

A preferred technique for the development of the characteristics mb, me, ml and mt is fully disclosed in copending application Ser. No. 653,560 and is not repeated here since it is not part of the present invention. In this regard, it should be pointed out that it may be desirable to reverse the piece-wise linear curve used in LUT 40 to derive characteristic value ml from that shown in the referent copending application to minimize peaking of noise.

The perceptual characteristic values mb, mt, me and ml generated by LUT's 132, 160, 150 and 140, respectively, are combined in a modification factor LUT 170 to provide a single perceptual value m representing the coefficient block. The combined perceptual value m provides a preliminary indication of the masking afforded by a particular coefficient block and thus the degree of quantization which can be tolerated before excessive artifacts are generated in the reproduced image. Larger values of m represent increased masking such that larger errors in the transmitted data can be tolerated allowing for decreased levels of quantization. On the other hand, smaller values of m represent decreased masking in which case fewer errors can be tolerated, thus requiring the use of increased quantization levels.

The perceptual value m is coupled to a series of multipliers 172, 174 and 176 for adjusting the quantization level represented thereby according to the regional energy estimations. In particular, the regional energy estimations from sort unit 116 are coupled to a weighting unit 162 which develops three weighting factors Wh, Wv and Wd. The maximum of the three regional energy estimation inputs is weighted with a weighting factor of 1.0, the minimum with a weighting factor of 2.0 and the middle value with a weighting factor of 1.5. The horizontal weighting factor Wh is applied to the second input of multiple 172, the vertical weighting factor Wv is applied to the second input of multiplier 174 and the diagonal weighting factor Wd is applied to the second input of multiplier 176.

In accordance with the foregoing, the outputs of multipliers 172, 174 and 176 comprise the products of perceptual value m and the respective weighting factors Wh, Wv and Wd. The products mWh, mWv and mWd are then applied to the inputs of three adders 178, 180 and 182. Specifically, mWh is applied to the positive input of adder 178, mWv to the positive input of adder 180 and mWd to the negative input of adder 182. Additionally, mWd is applied to a positive input of adder 178. A constant, equal to 1.0, is applied to a positive input of adder 182, the output of which (1-mWd) is applied to a positive input of adder 180. The outputs of adders 178 and 180 correspond to the control signals Ch and Cv, respectively. As shown Ch=m(Wh+Wd) and Cv=(1+Wv−Wd).

The peaking circuit 18' includes a pair of multipliers 184 and 186 that are supplied with the Ch and Cv control signals, respectively. A horizontal bandpass filter and noise coring circuit 188 processes the video signal (Y) and supplies an input signal Fh to multiplier 184. Similarly a vertical bandpass filter and noise coring circuit 190 processed video signal Y and supplies an output Pv to multiplier 186. A pair of adders 192 and 194 are supplied with the outputs of multipliers 184 and 186, respectively. Additionally the video signal Y is coupled to a positive input of adder 192, the output of which is coupled to adder 194. The output signal (ChPh+CvPv+Y) is applied to transform coder 19 in FIG. 1. It will be readily seen how a similar arrangement would apply with respect to the transmitter and receiver circuits shown in FIGS. 3 and 4.

What has been described is a novel peaking arrangement for use with a video signal, specifically in conjunction with a high definition television signal that is subjected to compression at the transmitter and corresponding expansion at the receiver. It is recognized that numerous changes in the described embodiment of the invention will be apparent to those skilled in the art without departing from its true spirit and scope. The invention is to be limited only as defined in the claims.

What is claimed is:

1. The method of processing a video signal comprising:
    coding said video signal into selected image types of different perceptual characteristics;
    generating a control signal in response to said selected image types; and
    peaking said video signal in accordance with said control signal.

2. The method of claim 1 wherein said coding comprises digitizing said video signal;
    transform coding said digitized video signal; and
    classifying said transform coded video signal into said selected image types.

3. The method of claim 2, further including compressing said peaked video signal; and
transmitting said compressed peaked video signal.

4. The method of claim 3 wherein said selected image types coding generates a horizontal and a vertical control signal and further including horizontally and vertically peaking said video signal in response to said control signal.

5. The method of claim 4 wherein each of said horizontal control signal and said vertical control signal includes a diagonal contribution.

6. The method of claim 4 wherein each of said horizontal control signal and said vertical control signal is weighted to reflect the energy in a respective series of transform coefficients in a corresponding direction.

7. A processing system for a video signal representative of a plurality of pixels comprising:
means for transforming blocks of said pixels into corresponding groups of transform coefficients;
means for developing a control signal representative of the perceptual nature of each of said groups of coefficients; and
means for peaking said pixel blocks in response to the control signal developed for the corresponding coefficient group.

8. The system of claim 7, further including:
means for compressing said peaked pixel blocks in response to the control signal for the corresponding coefficient group; and
means for transmitting said compressed video signal.

9. The system of claim 7, further including:
multiplexing means for combining said control signal and said peaked pixel blocks.

10. A receiver for processing a received signal including a control signal indicative of the perceptual nature of successive blocks of video pixels transmitted in the form of a corresponding series of transform coefficient groups comprising:
means for recovering said control signal;
means for processing said groups of transform coefficients to recover the corresponding video pixel blocks; and
means for peaking said video pixel blocks in response to said control signal.

11. The receiver of claim 10 wherein a horizontal and a vertical control signal are provided and further including means for recovering said horizontal and said vertical control signals and means for peaking said video pixel blocks in response to said horizontal and said vertical control signals.

12. The receiver of claim 11 wherein said horizontal and vertical control signals reflect the degree to which a respective series of transform coefficients is characterized by a plurality of perceptual characteristics.

13. The receiver of claim 12 wherein each of said horizontal and vertical control signals includes a diagonal contribution.

14. The receiver of claim 12 wherein each of said horizontal and vertical control signals is weighted to reflect the energy in a respective series of transform coefficients in the corresponding direction.

* * * * *